(12) United States Patent
Cai et al.

(10) Patent No.: US 7,221,818 B2
(45) Date of Patent: May 22, 2007

(54) OPTICAL SWITCH

(75) Inventors: Ming Cai, Fremont, CA (US); Xuehua Wu, Union City, CA (US); Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 141 days.

(21) Appl. No.: 11/070,450

(22) Filed: Mar. 1, 2005

(65) Prior Publication Data

US 2006/0198574 A1 Sep. 7, 2006

(51) Int. Cl.
*G02B 6/36* (2006.01)
*G02B 6/42* (2006.01)

(52) U.S. Cl. .............................. 385/16; 385/15; 385/17; 385/18; 385/25

(58) Field of Classification Search .................. 385/15, 385/16, 17, 18, 19, 20, 21, 22, 25
See application file for complete search history.

(56) References Cited

U.S. PATENT DOCUMENTS

| | | | | |
|---|---|---|---|---|
| 6,694,073 | B2* | 2/2004 | Golub et al. ................... | 385/18 |
| 6,711,314 | B1* | 3/2004 | Mori et al. ..................... | 385/17 |
| 6,819,821 | B2* | 11/2004 | Lacey et al. ................... | 385/17 |
| 2004/0107232 | A1* | 6/2004 | Ishii et al. .................... | 708/300 |
| 2006/0198574 | A1* | 9/2006 | Cai et al. ....................... | 385/16 |

* cited by examiner

*Primary Examiner*—Brian M. Healy
(74) *Attorney, Agent, or Firm*—Patterson & Sheridan, L.L.P.

(57) ABSTRACT

The present invention relates to an optical switch. The optical switch includes at least two binary control elements movable between a first and second position. The binary control elements include an at least one angle tuning element for adjusting the pathway of an optical signal. With a binary control element in the first position, the angle tuning element is able to adjust the pathway of an optical signal. With the binary control element in a second position, the angle tuning element is not able to adjust the optical pathway of an optical signal. The optical switch of the present invention can also concurrently switch multiple optical signals in parallel.

20 Claims, 11 Drawing Sheets

OPTICAL SWITCH

BACKGROUND OF THE INVENTION

1. Field of the Invention

The present invention relates generally to an optical switch, and more specifically to an optical switch for switching between multiple input or output optical pathways.

2. Description of the Related Art

Optical switches are widely deployed in optical networks to provide functions such as light path routing, protection switching, and system performance monitoring. The switching function is generally achieved by mechanically moving fiber or other bulk optic elements using stepper motors, controlled actuators or electrical relays.

FIG. 1 shows a typical prior art 1×2 optical switch configuration. The optical switch 100 is shown in a first position, whereby an input optical signal 102 is directed to a first output optical waveguide 121. FIG. 2 shows the prior art 1×2 optical switch of FIG. 1 in a second position. The optical switch 100 is shown in a second position, whereby the input optical signal 102 is directed to a second output optical waveguide 122.

A 1×N optical switch (with N>2) is usually realized by cascading multiple 1×2 optical switches. FIG. 3 shows a typical cascaded 1×4 optical switch 300 of the prior art where three 1×2 switch elements are utilized. Within a first optical switch 310, an input optical signal 302 is directed along either a first optical pathway 314 to a second optical switch 320 or along a second optical pathway 316 to a third optical switch 330. The second optical switch 320 directs the input optical signal 302 between first and second output optical waveguides 321, 322, while the third optical switch 330 directs the input optical signal 302 between third and fourth output optical waveguides 333, 334.

With the typical cascading technique of the prior art, a 1×N optical switch consists of N−1 1×2 individual optical switching elements. As N increases, the number of the 1×2 optical switching elements increases linearly. For example, the 1×4 optical switch of the prior art shown in FIG. 3 consists of three 1×2 optical switching elements. A 1×8 optical switch of this type would require seven 1×2 optical switching elements, a 1×16 optical switch would require fifteen 1×2 optical switching elements, and so forth. These designs result in increased bulk and complexity, especially as the size of the optical switch increases. Insertion losses also accumulate rapidly as the number of cascading levels increase. As such, cascading 1×2 optical switches are not an optimal solution for high port-count 1×N optical switches. Alternate non-cascading type optical switches of the prior art also require N−1 optical switches or have switching elements that move between more than two switching positions. The number of redundant switching elements adds to the costs of these devices and results in overly complex switching logic. Further, moving between more than two switching positions requires additional time and strict alignment tolerances, making these types of switches unsuitable for low-cost or high-speed applications.

Therefore, there is a need for an improved optical switch which overcomes the shortcomings of the prior art described above.

SUMMARY OF THE INVENTION

Accordingly, the optical switch of the present invention includes a first binary control element having a first angle tuning element that is moveable between a first position and a second position. It also includes a second binary control element, in series with the first binary control element, and having a second angle tuning element that is moveable between a first position and a second position. The first binary control element is configured such that, in the first position, the first angle tuning element is able to adjust a pathway of an optical signal, and in the second position, the first angle tuning element is not able to adjust the pathway of the optical signal. The second binary control element is configured such that, in the first position, the second angle tuning element is able to adjust the pathway of the optical signal and, in the second position, the second angle tuning element is not able to adjust the pathway of the optical signal.

According to an alternate embodiment of the optical switch of the present invention, the optical switch comprises a first optical switching stage that includes a first binary control element having a first angle tuning element moveable between a first position and a second position. It also includes a second optical switching stage in series with the first optical switching stage. The second optical switching stages includes a second binary control element having a second angle tuning element moveable between a first position and a second position. The first binary control element is configured such that, in the first position, the first angle tuning element is able to adjust a pathway of an optical signal input and, in the second position, the first angle tuning element is not able to adjust the pathway of the optical signal. The second binary control element is configured such that, in the first position, the second angle tuning element is able to adjust the pathway of the optical signal and, in the second position, the second angle tuning element is not able to adjust the pathway of the optical signal.

According to yet another alternate embodiment of the optical switch of the present invention, the optical switch comprises a binary control element moveable between a first position and a second position. The binary control element includes a first angle tuning element and a second angle tuning element. Wherein the first angle tuning element is able to adjust the optical pathway of a first optical signal, and the second angle tuning element is able to adjust the pathway of a second optical signal.

Other features and advantages of the present invention are given in the following description and illustrative figures.

DETAILED DESCRIPTION

Figure 1:
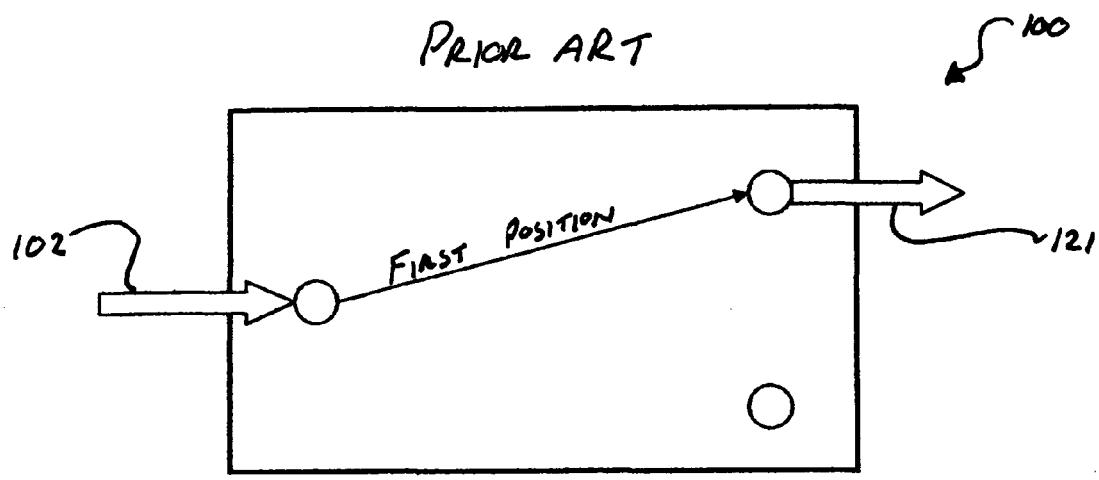
FIG. 1 shows a prior art 1×2 optical switch a first position.
Figure 2:
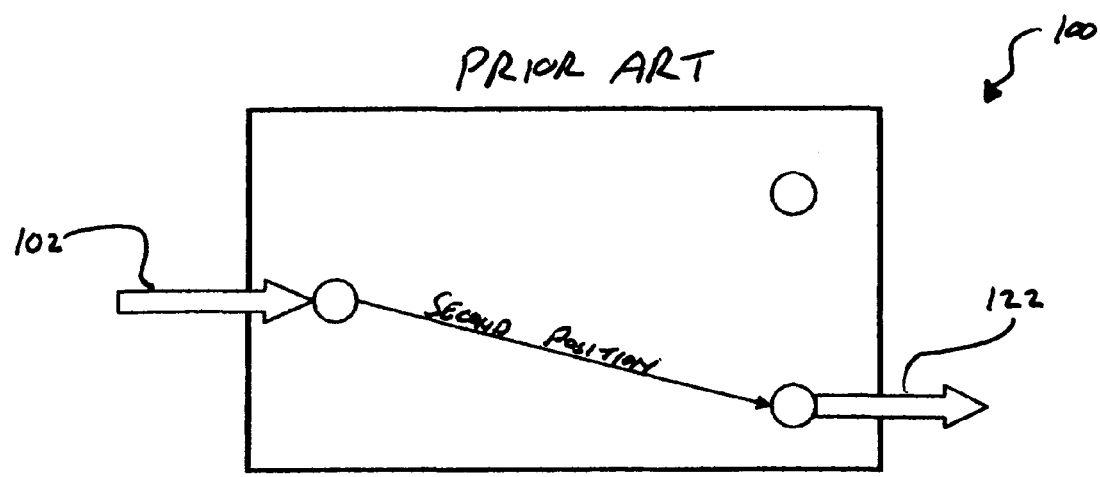
FIG. 2 shows the prior art 1×2 optical switch of FIG. 1 in a second position.
Figure 3:
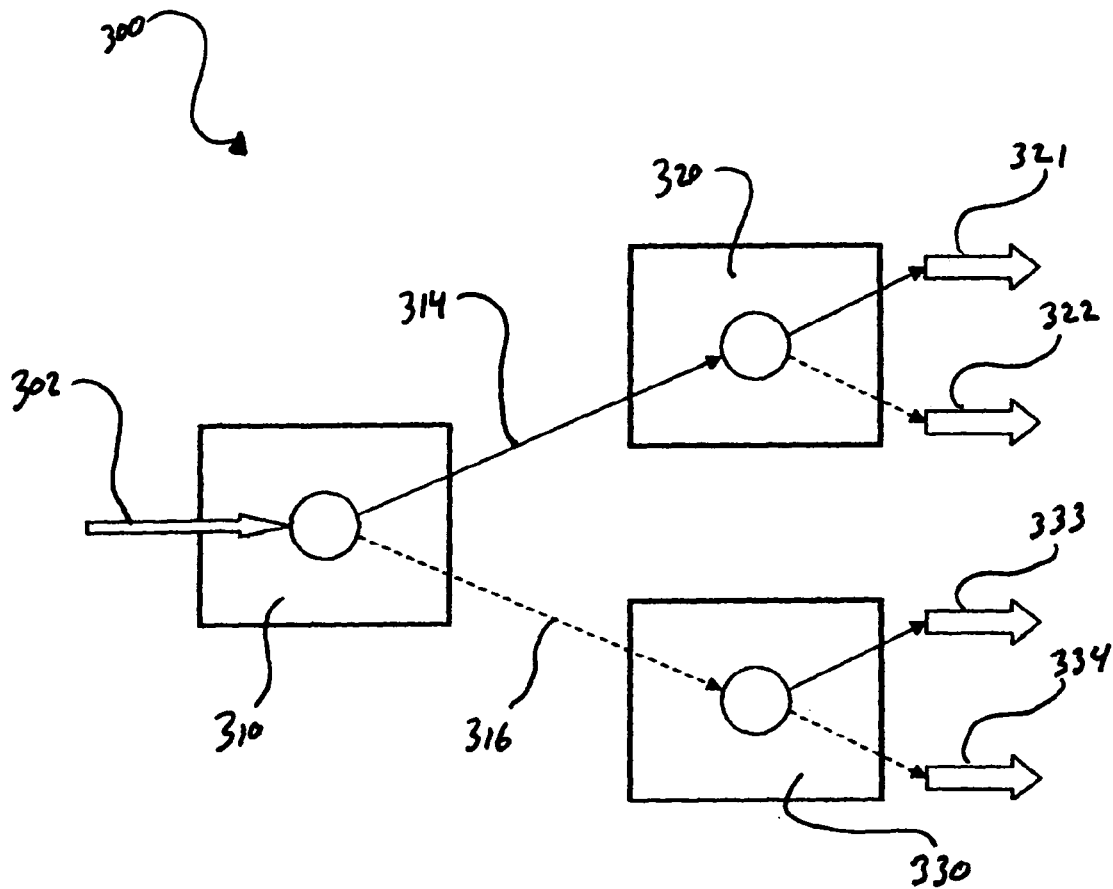
FIG. 3 shows a prior art cascading 1×4 optical switch.
Figure 4:
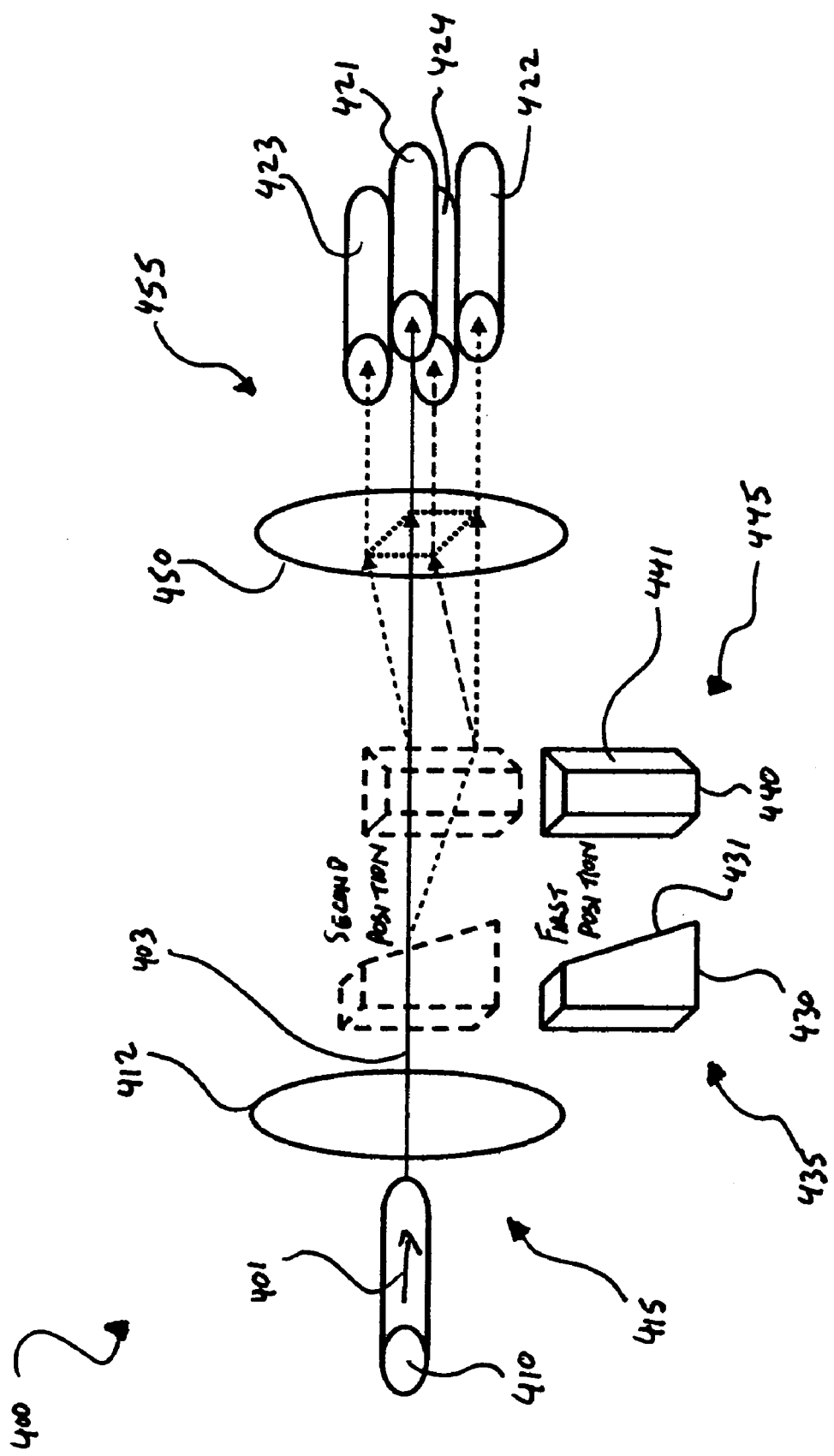
FIG. 4 shows a 1×4 optical switch, according to one embodiment of the present invention.

FIG. 4 shows a 1×4 optical switch, according to one embodiment of the present invention. By spatially multiplexing two 1×2 optical switches 435, 445 in series within two orthogonal planes, a 1×4 optical switch 400 is created. The 1×4 optical switch 400 includes an input optical assembly 415 having an input optical waveguide 410 and an input collimator 412, and an output optical assembly 455 having four output optical waveguides 421, 422, 423, 424 and an output collimator 450. An optical signal 401 is launched from the input optical waveguide 410 selectively into one of the four output optical waveguides 421, 422, 423, 424. The first 1×optical switch 435 includes a first prism 430 having an angled facet 431 that can adjust the optical pathway 403 of the optical signal 401. The second 1×2 optical switch 445 includes a second prism 440 having an angled facet 441 that can adjust the optical pathway 403 of the optical signal 401 in a direction orthogonal to that of the first prism 430. The prisms 430, 440 are positioned between the input optical assembly 415 and the output optical assembly 455 such that they may be moved into and out of the optical pathway 403 of the optical signal 401. To reduce the footprint of the 1×4 optical switch 400, a four-waveguide collimator is used in this example, however, individual collimators could also be used for each output optical waveguide.

As each prism 430, 440 provides the functionality of an individual 1×2 optical switch, the two optical switches 435, 445 share the same first output optical waveguide 421 when both prisms 430, 440 are in a first position out of the optical pathway 403. When the first prism 430 is moved into a second position within the optical pathway 403, while the second prism 440 remains in the first position, the optical pathway 403 is adjusted into the second output optical waveguide 422. Similarly, when the first prism 430 remains in the first position and the second prism 440 is moved into a second position within the optical pathway 403, the optical pathway 403 is adjusted into the third output optical waveguide 423. If both prisms 430, 440 are moved into the second position within the optical pathway 403, the optical pathway is adjusted to the fourth output optical waveguide 424. Thus, this embodiment of the present invention is therefore a 1×4 switch using only 2 binary optical switching elements. The first binary optical switch is provided by the first prism moving from a first position to a second position. The second binary optical switch is provided by the second prism moving from a first position to a second position. As such, the optical pathways in this embodiment of the present invention are spatially multiplexed in a 3-D space along two planes. Similarly, three prisms can be inserted between the input and output collimating lenses to generate a maximum of 8 different optical pathways, and four prisms result in a maximum 16 different pathways, and so forth.

Figure 5A:
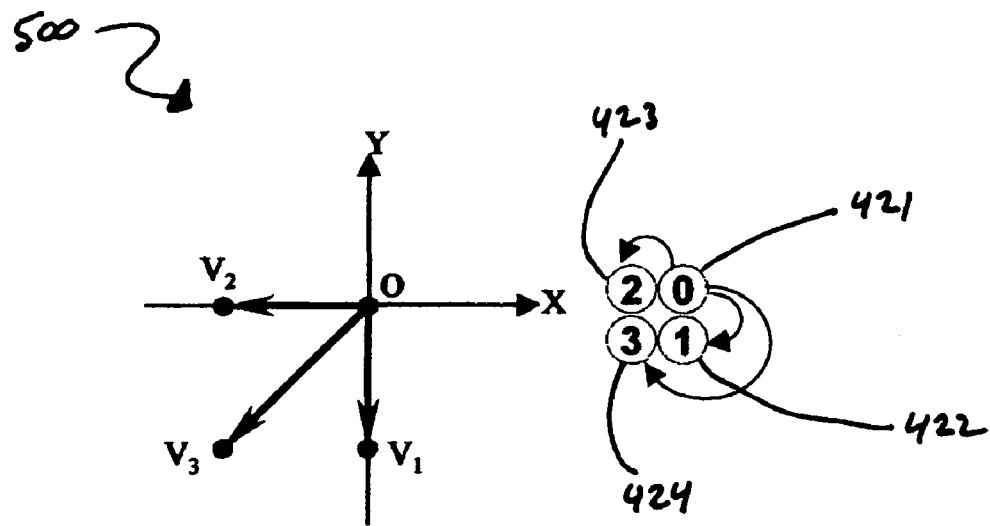
FIG. 5A shows a vector representation of the 1×4 optical switch shown in FIG. 4.

To obtain a clear understanding of how the spatial multiplexing works, consider a 3-D coordinate system with the z-axis coincident with the light propagation direction of the initial state of the optical signal. Each of the angle tuning elements used within the optical switch turns or adjusts the light by a small angle relative to the light's initial optical path. The resulting optical path forms a 2-D characteristic vector when projected onto a X–Y plane. FIG. 5A shows a vector representation of the 1×4 optical switch shown in FIG. 4. Utilizing two prisms arranged in series, an input optical signal applied to the optical switch of FIG. 4 will follow one of the four following vectors:

0

$V_1$ $V_2$ $V_1+V_2(V_3)$

The above four vectors dictate the position of the output optical waveguides 421, 422, 423, 424. As such, in this configuration the output optical waveguides are arranged in a 2×2 matrix.

The maximum number of output optical waveguides (or pathways) is obtained if all of the characteristic vectors and their combinations do not repeat themselves. The optical switch of the present invention can be seen as a series of binary control elements, switchable between first position and second positions. The minimum number of binary control elements required to achieve a 1×N optical switch is the smallest integer equal to or larger than $\log_2 N$. We have $N-1 > \lceil \log_2 N \rceil$, for $N > 2$.

That is to say, the most efficient design for a 1×N optical switch is to utilize only $\lceil \log_2 N \rceil$ binary control elements. The binary control elements may be chosen from among electrical relays, linear actuators, comb drives, step motors, and the like. By having a reduced number of optical switching stages, embodiments of the present invention will have a reduced insertion loss relative to optical switches of the prior art.

Figure 5B:
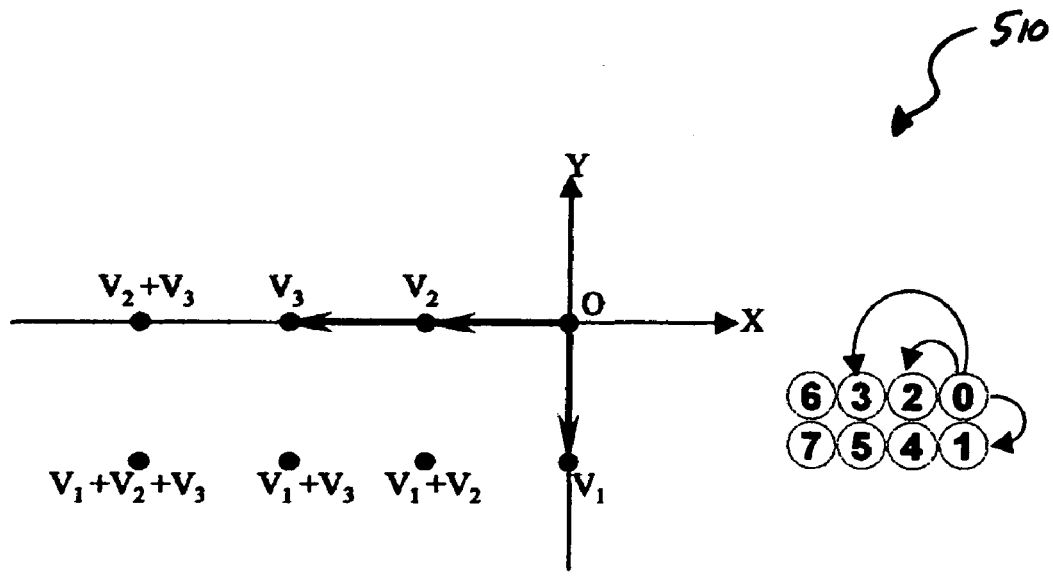
FIGS. 5B–D show the vector representations of an optical switch, according to various alternative embodiments of the present invention.
Figure 5C:
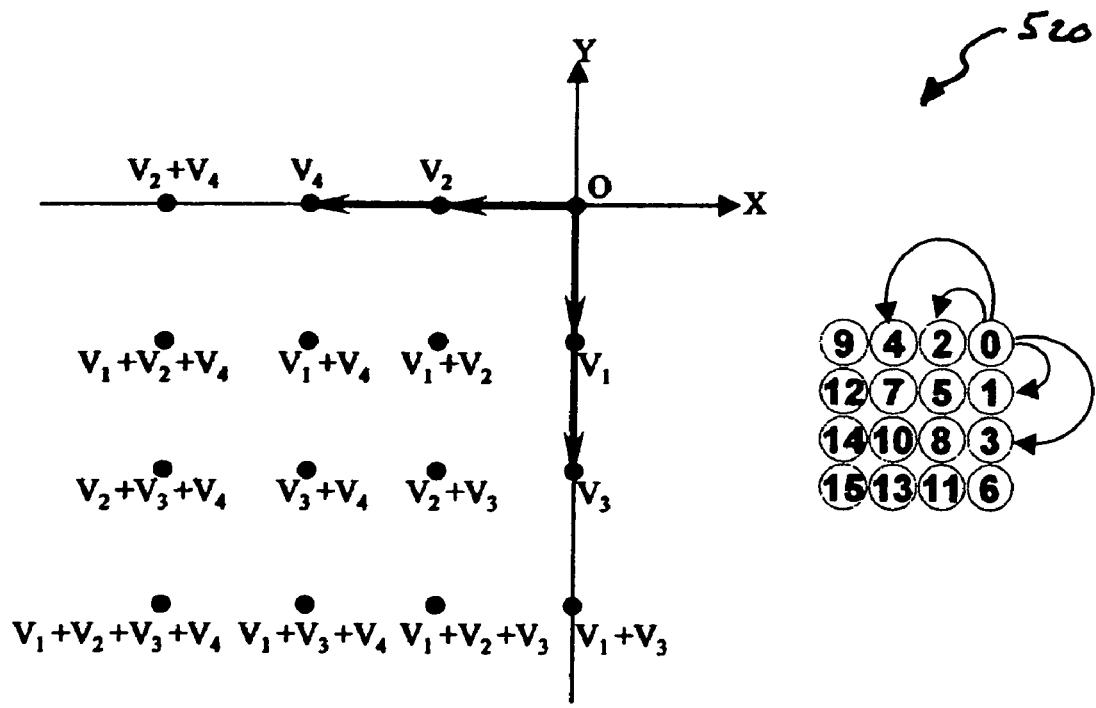
Figure 5D:
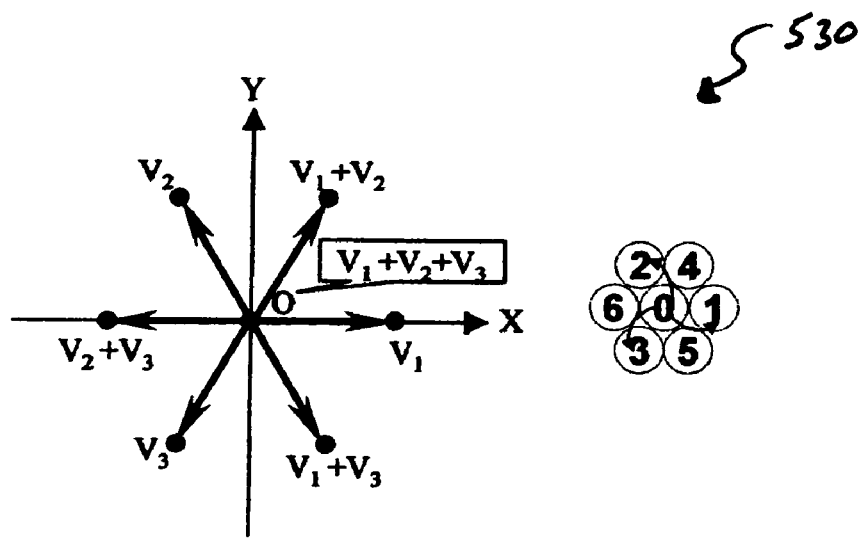

FIGS. 5B–5D show vector representations of 1×8, 1×16, and 1×7 optical switches designed in accordance with one or more aspects of the present invention. The vector representation of the 1×8 optical switch 510 shown in FIG. 5B forms a 2×4 matrix and is switchable utilizing three prisms in series. The vector representation of the 1×16 switch 520 shown in FIG. 5C forms a 4×4 matrix switchable utilizing four prisms in series. In the vector representation of the 1×7 optical switch 530 shown in FIG. 5D, three prisms are utilized in series, however, only 7 individual output pathways are created by the three vectors because the sum of the three vectors is coincident with the origin (i.e., the initial alignment of the optical pathway). Similar to using a four-waveguide collimator in the 1×4 switch of FIG. 4, a multi-waveguide collimator or collimating lens with geometry matching the output optical waveguides of FIGS. 5B–D could be used to reduce the size of the optical switches.

Figure 6:
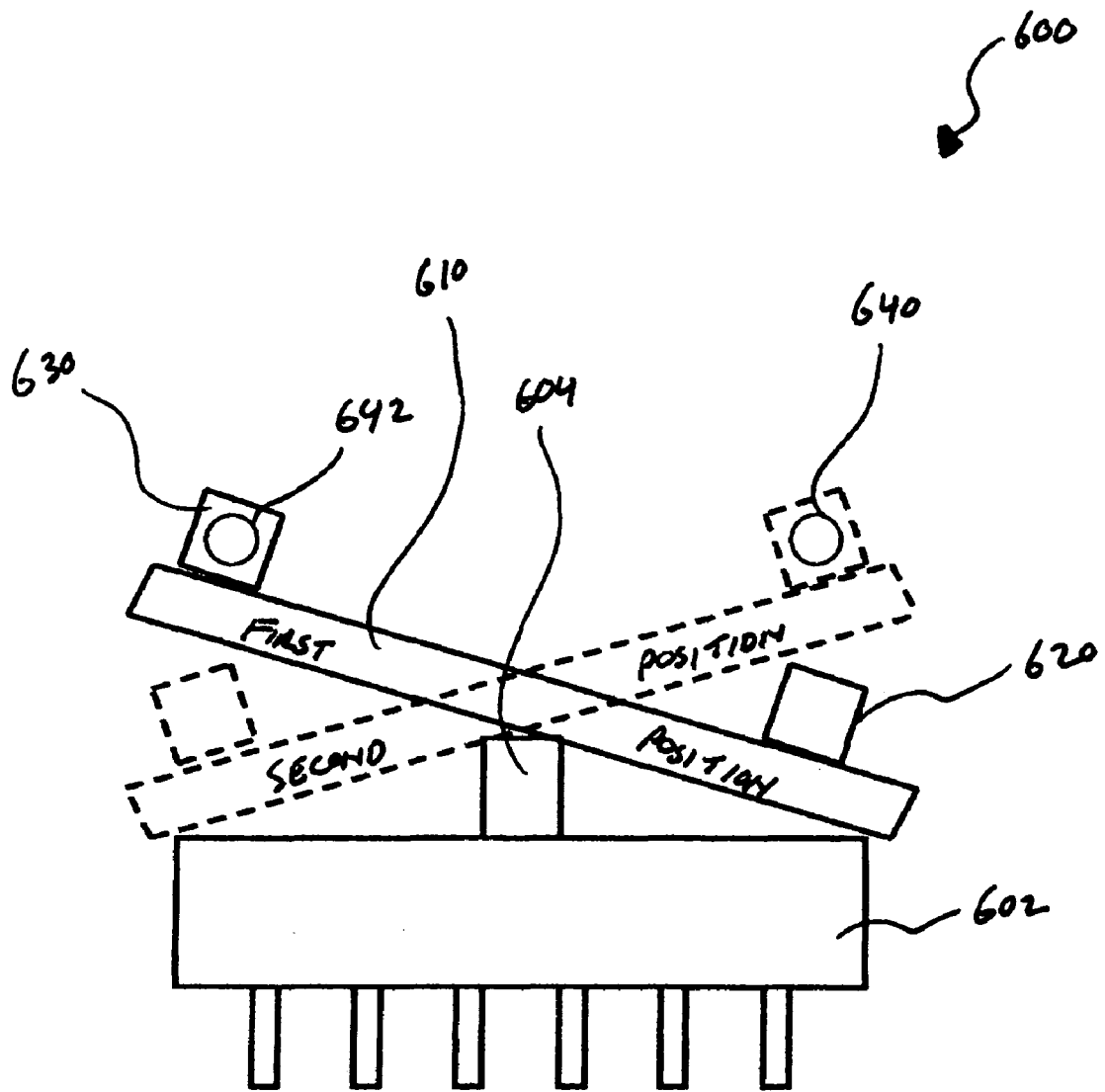
FIG. 6 shows an electrical relay including multiple angle tuning elements.

Another alternate embodiment of the optical switch of the present invention makes use of both sides of a lever arm of an electrical relay. Electrical relays used in optical switching typically have an angle-tuning element attached to a first distal end of the lever arm to achieve the desired movements between a first and second position. However, if a second angle-tuning element is attached to a second distal end of the lever arm, it moves the same as the first angle-tuning element, but in an opposite direction. FIG. 6 shows an electrical relay including multiple angle tuning elements. The electrical relay 600 includes a body 602, pivot arm 604, lever arm 610, and prisms 620, 630 at each distal end of the lever arm 610. The lever arm 610 moves from a first position to a second position. In the first position, the first prism 620 is out of a first optical pathway 640 (into the page), and the second prism 630 is within a second optical pathway 642 (also into the page). When the lever arm 610 is moved into the second position, the first prism 620 is moved into the first optical pathway 640 and the second prism 630 is removed from the second optical pathway 642.

Figure 7:
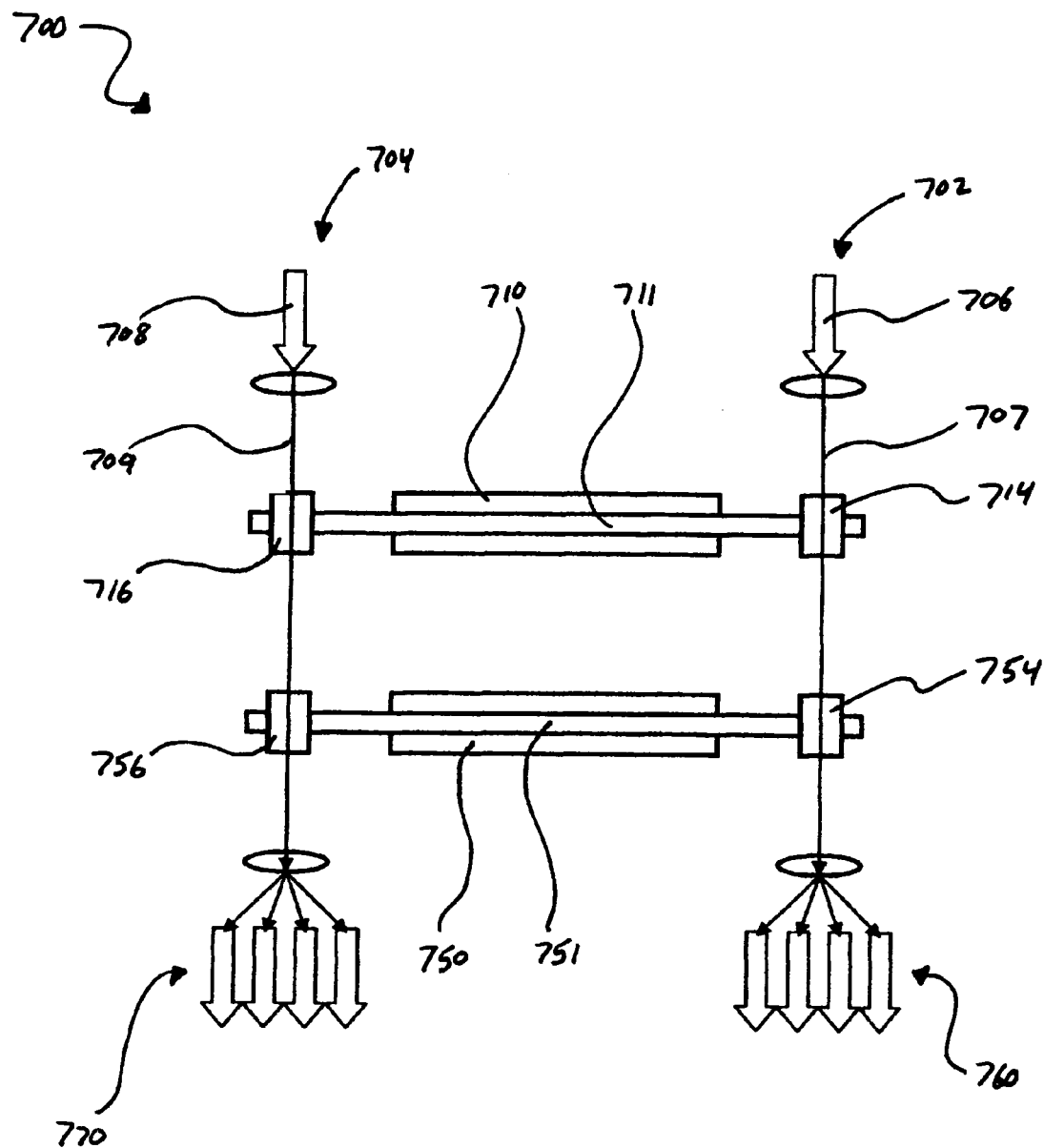
FIG. 7 shows an embodiment of the present invention using multiple prisms mounted on an electrical relay.

FIG. 7 shows yet another embodiment of the present invention using multiple prisms mounted on an electrical relay. Two 1×N optical switches are controlled by the same sets of electrical controls. The optical switch 700 includes dual 1×4 switches 702, 704. The dual 1×4 optical switches 702, 704 are independent, they switch simultaneously to respective output optical waveguides 760, 770. A first electrical relay 710 includes prisms 714, 716 located at opposite distal ends of the lever arm 711. A second electrical relay 750 includes prisms 754, 756 located at opposite distal ends of the lever arm 751. Similar to the electrical relay shown in FIG. 6, the electrical relays 710, 750 can move from a first position to a second position, causing alternate prisms to enter and exit the optical pathways 707, 709. When the first electrical relay 710 is in a first position, prism 714 is out of the optical pathway 707 of the first input optical signal 706, while prism 716 is within the optical pathway 709 of the second input optical signal 708. As such, the first input optical signal 706 proceeds uninterrupted, while the second optical signal 708 is deflected. Conversely, when the first electrical relay 710 is in position 2, prism 714 is within the optical pathway 707 of the first input optical signal 706, while prism 716 is out of the optical pathway 709 of the second input optical signal 708. Therefore the first optical signal 706 is deflected while the second optical signal 708 proceeds uninterrupted. The second electrical relay 750 functions in a similar fashion to the first electrical relay 710, moving the prisms 754, 756 into and out of the input optical pathways 706, 708 respectively. The optical alignment can be also arranged such that prisms 714 and 716 enter or exit the optical path 707 and 709 simultaneously. The same is true for prisms 754 and 756.

Figure 8:
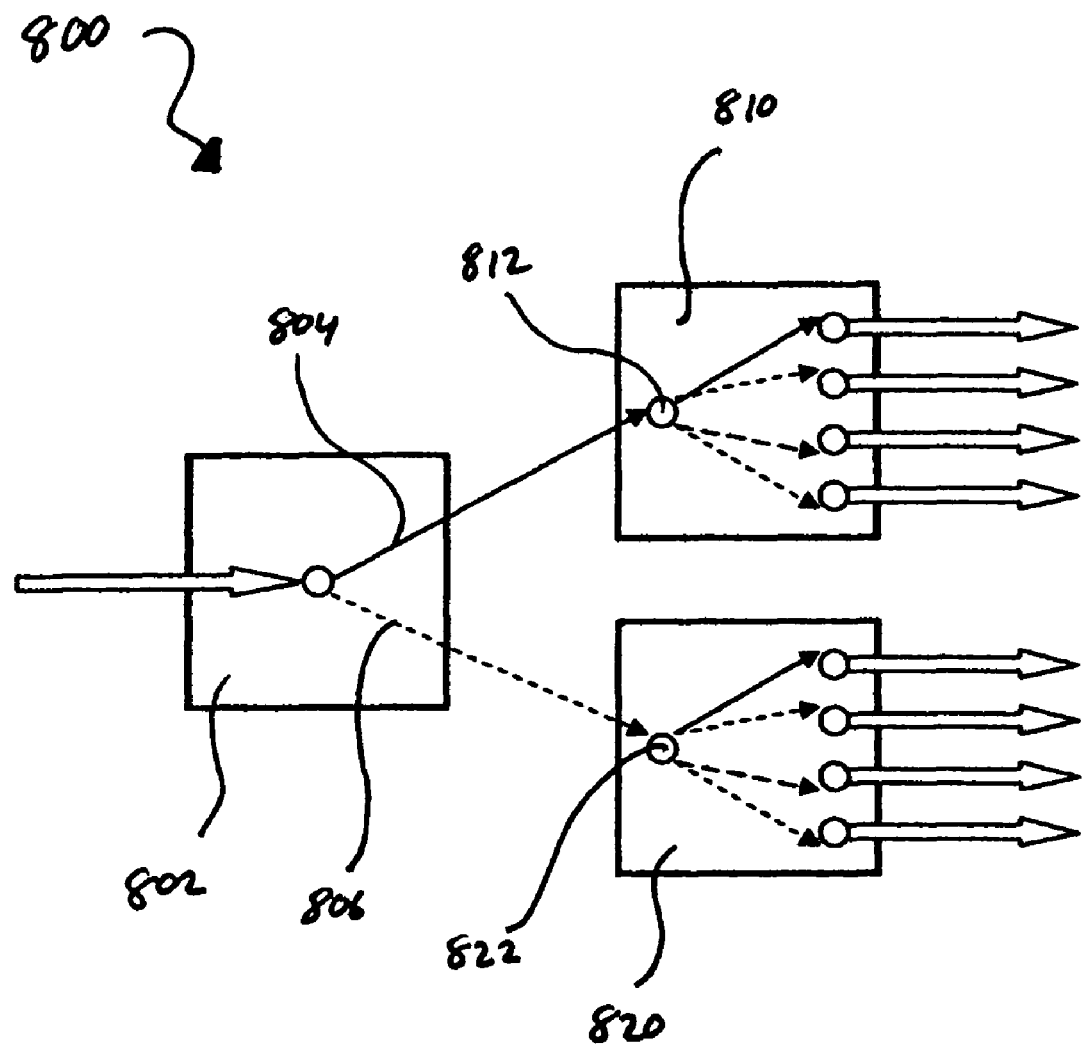
FIG. 8 shows a 1×8 optical switch, according to one embodiment of the present invention.

A dual optical switch is particularly useful to simplify the complexity of the cascading technique described in the prior art. FIG. 8 shows a 1×8 optical switch 800, according to one embodiment of the present invention, that includes a 1×2 optical switch 802 followed by dual 1×4 optical switches 810, 820. The two output optical pathways 804, 806 of the 1×2 optical switch 802 respectively couple to the two input optical pathways 812, 822 of the dual 1×4 optical switches 810, 820. Although the dual 1×4 optical switches 810, 820 are not independently switchable, the 1×8 optical switch 800 functions perfectly well because the switching logic requires only one of the dual 1×4 optical switches 810, 820, together with the 1×2 optical switch 802, to be set in a desired state at one time. The other 1×4 switch, if not selected, is idle, and thus can be in any state.

Figure 9:
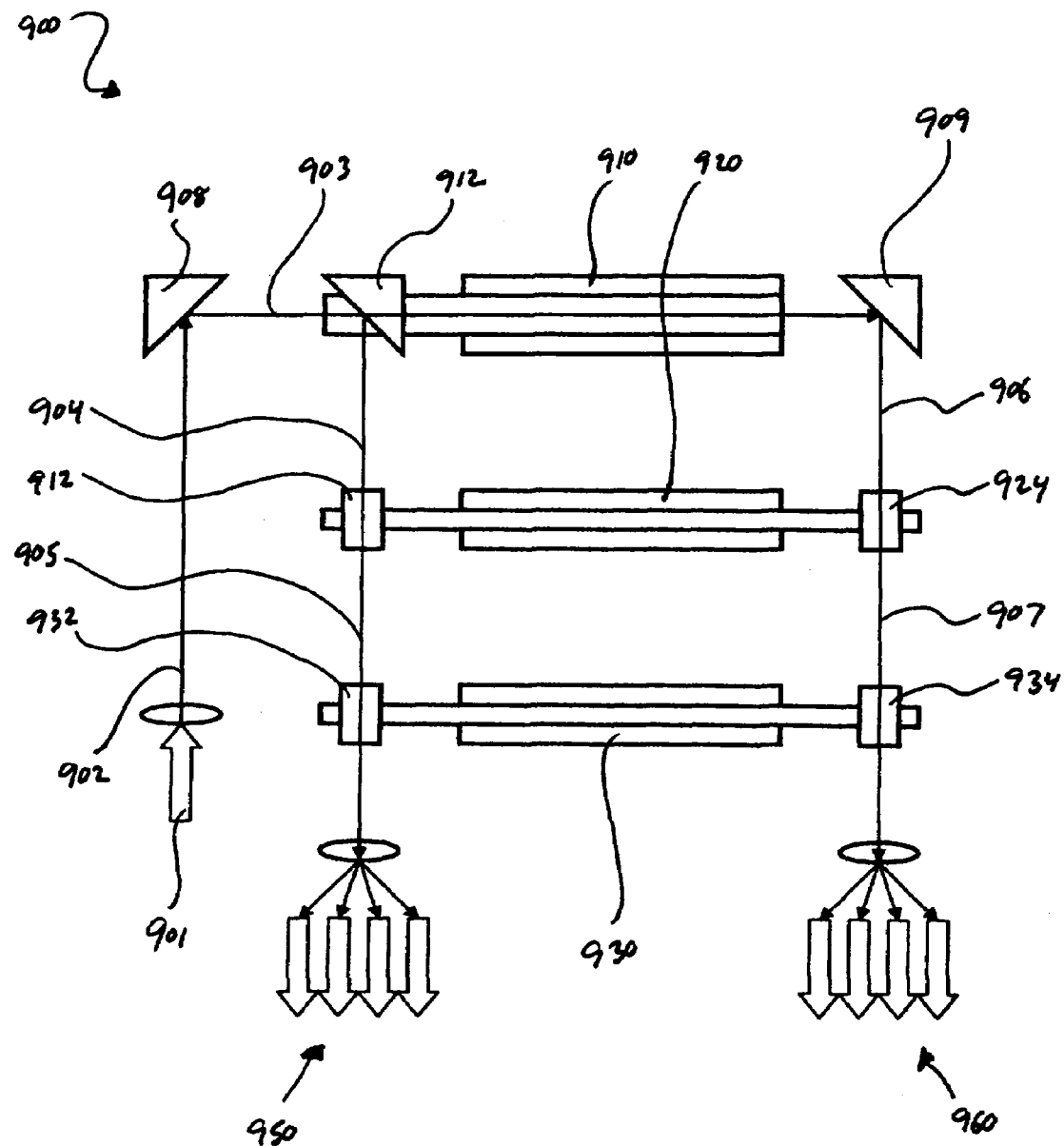
FIG. 9 shows an integrated 1×8 optical switch, according to one embodiment of the present invention.

Yet another alternate embodiment of the present invention uses multiple prisms mounted on an electrical relay and further reduces the complexity of the 1×8 optical switch shown in FIG. 8. FIG. 9 shows an integrated 1×8 optical switch with three binary control elements. This gives a more compact design compared with the cascading 1×N optical switch design described in the prior art. The level of integration is somewhat less than that shown in the optical switch of FIG. 5, however, the embodiment of FIG. 9 reduces the complexity of making high port-count collimators and aligning multiple angle-tuning elements.

The 1×8 optical switch 900 includes three binary control elements 910, 920, 930 moveable between first and second positions. In the first positions, the first binary control element 910 disposes a moveable mirror 912 within an optical pathway 903, the second binary control element 920 disposes a first prism 922 within an optical pathway 904 and a second prism 924 out of an optical pathway 906, and the third binary control element 930 disposes a third prism 932 within an optical pathway 905 and a fourth prism 934 out of an optical pathway 907. In the second positions, the first binary control element 910 disposes the moveable mirror 903 out of the optical pathway 903, the second binary control element 920 disposes the first prism 922 out of the optical pathway 904 and the second prism 924 within the optical pathway 906, and the third binary control element 930 disposes the third prism 932 out of the optical pathway 905 and the fourth prism 934 within the optical pathway 907.

An optical signal 901 enters the optical switch 900 along an optical pathway 902. It is reflected off a first fixed mirror 908 along the optical pathway 903. The optical signal 901 is then reflected off of the moveable mirror 912 or a second fixed mirror 909, depending on the position of the first binary control element 910. The optical signal 901 reflected off of the moveable mirror 912 is directed towards the output optical waveguides 950, along the optical pathway 904, 905, adjusted by the first and third prisms 922, 932 according to the positions of the second and third binary control elements 920, 930. Similarly, the optical signal 901 reflected off of the second fixed mirror 909 is directed towards the output optical waveguides 960, along the optical pathways 906, 907, adjusted by the second and fourth prisms 924, 934 according to the positions of the second and third binary control elements 920, 930.

Figure 10:
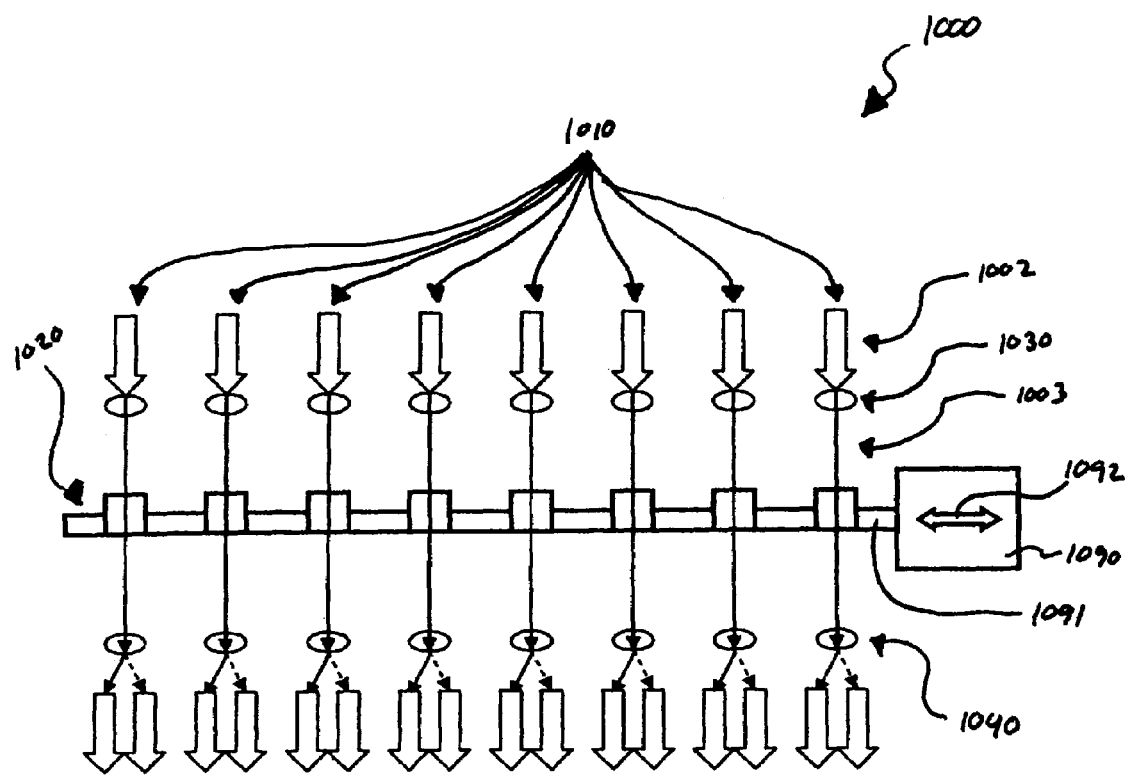
FIG. 10 shows an optical switch of the present invention including eight 1×2 optical switches.

Another alternate embodiment of the present invention using multiple prisms on an electrical relay integrates a series of 1×2 optical switches with one binary control element. FIG. 10 shows an optical switch 1000 including eight 1×2 optical switches 1010. Eight angle-tuning elements 1020 are attached on a single bar 1091. The bar 1091 is controlled by an electrical relay 1090 to move between a first position and a second position such that the eight angle-tuning elements 1020 can be moved into or out of the respective optical pathways 1003 of the input optical signals 1002 traveling between the eight pairs of single input collimating lenses 1030 and dual output collimating lenses 1040. The bar 1091 preferably moves along the bar direction 1092, controlled by the electrical relay 1090, or alternatively a two-position linear actuator. All 1×2 optical switches in the optical switch 1000 switch simultaneously. The embodiment of the present invention illustrated in FIG. 10 is also suitable for making a 1×16 optical switch with a minimum number of binary controls.

Figure 11:
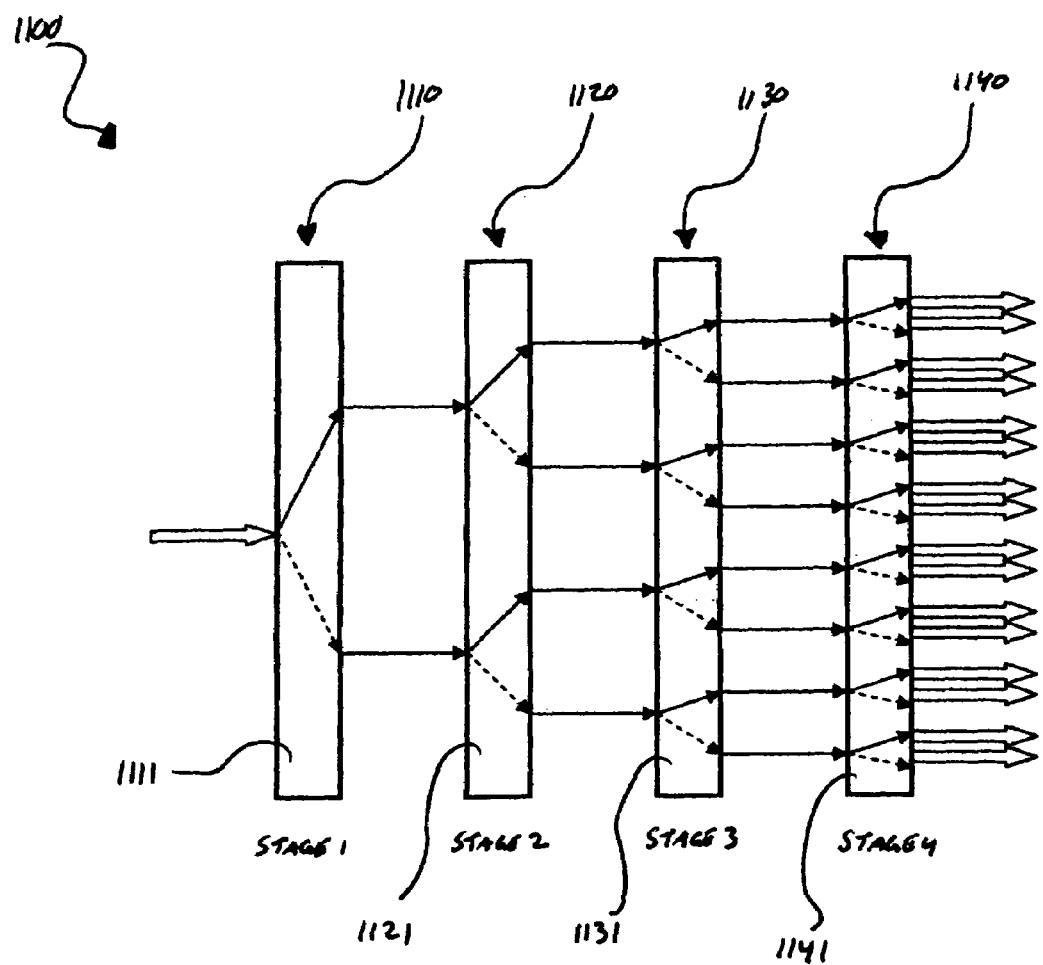
FIG. 11 shows a 1×16 optical switch, according to one embodiment of the present invention.

FIG. 11 shows a 1×16 optical switch 1100, according to one embodiment of the present invention. The 1×16 optical switch 1100 is built in four optical switching stages 1110, 1120, 1130, 1140. Each of the optical switching stages 1110, 1120, 1130, 1140 uses one binary control element 1111, 1121, 1131, 1141 respectively. The three binary control elements 1121, 1131, 1141, switch multiple 1×2 optical switches. For efficiency, the optical switch shown in FIG. 9 could also be used to replace the first three optical switching stages 1110, 1120, 1130 of FIG. 11.

One of ordinary skill in the art will recognize that the angle tuning elements used in embodiments of the present invention may be various types of prisms, mirrors, or other appropriate components. Further, the angle tuning elements may be constructed such that they can be disposed within the optical pathway of an optical signal when the binary control element is in both the first and second positions. In this configuration a single angle tuning element could effectively comprise two separate parts, which could be considered two separate angle tuning elements. In a first position, a first part of the angle tuning element would be within the pathway of an optical signal, directing it along a first pathway, while a second part of the angle tuning element would be removed from the pathway of the optical signal. In a second position, the first part of the angle tuning element would be removed from the pathway of the optical signal, while the second part of the angle tuning element would be within the pathway of the optical signal, directing it along a second optical pathway.

The binary control elements may be selected from an electrical relay, linear actuator, comb drive, or another binary control element known to one of skill in the art.

The angle tuning elements and binary control elements used in the various embodiments of the present invention also need not all be of one type. For example, they could be any combination of those components described previously. Further, the optical switches may be embedded within another optical switch or optical component. They can also function as either a 1×N optical switch, with N output ports, or as a N×1 optical switch with N input ports.

While several embodiments according to the present invention have been disclosed, one of ordinary skill in the art will appreciate that these embodiments are illustrative only, and not exhaustive. As such, the scope of the invention should be determined with respect to the appended claims.

The invention claimed is:

1. An optical switch comprising:
   a first binary control element having a first angle tuning element that is moveable between a first position and a second position; and
   a second binary control element in series with the first binary control element and having a second angle tuning element that is moveable between a third position and a fourth position,
   wherein the first binary control element is configured such that, in the first position, the first angle tuning element is able to adjust a pathway of an optical signal, in the second position, the first angle tuning element is removed from the pathway of the optical signal and therefore not able to adjust the pathway of the optical signal, and the second binary control element is configured such that, in the third position, the second angle tuning element is able to adjust the pathway of the optical signal and, in the fourth position, the second angle tuning element is removed from the pathway of the optical signal and therefore not able to adjust the pathway of the optical signal.

2. The optical switch of claim 1, wherein the number of binary control elements is the rounded-up integer value of $Log_2 N$.

3. The optical switch of claim 1, wherein the first binary control element and second binary control element move independently of each other.

4. The optical switch of claim 1, wherein the first angle tuning element or the second angle tuning element is at a distal end of a lever arm that is configured to move the tuning element in and out of the pathway of the optical signal.

5. The optical switch of claim 4, wherein a third angle tuning element is disposed at an opposite distal end of the lever arm.

6. The optical switch of claim 1, wherein the first angle tuning element or the second angle tuning element is disposed on a bar.

7. The optical switch of claim 6, wherein the bar includes a third angle tuning element.

8. The optical switch of claim 1, wherein the first angle tuning element is able to adjust the pathway of the optical signal along a first plane.

9. The optical switch of claim 8, wherein the second angle tuning element is able to adjust the pathway of the optical signal along a second plane.

10. The optical switch of claim 9, wherein the second plane is orthogonal to the first plane.

11. The optical switch of claim 9, wherein a third angle tuning element is able to adjust the pathway of the optical signal along a third plane.

12. The optical switch of claim 11, wherein the first plane, the second plane, and the third plane are orientated at 120 degrees to each other.

13. The optical switch of claim 1, wherein the at least one angle tuning element is a prism.

14. The optical switch of claim 1, wherein the first binary control element or the second binary control element is selected from the group consisting of electrical relays, linear actuators, comb drives, and stepper motors.

15. An optical switch comprising:
    a first optical switching stage that includes a first binary control element having a first angle tuning element moveable between a first position and a second position; and
    a second optical switching stage in series with the first optical switching stage and including a second binary control element having a second angle tuning element moveable between a third position and a fourth position,
    wherein the first binary control element is configured such that, in the first position, the first angle tuning element is able to adjust a pathway of an optical signal input and, in the second position, the first angle tuning element is removed from the pathway of the optical signal and therefore not able to adjust the pathway of the optical signal, and the second binary control element is configured such that, in the third position, the second angle tuning element is able to adjust the pathway of the optical signal and, in the fourth position, the second angle tuning element is removed from the pathway of the optical signal and therefore not able to adjust the pathway of the optical signal.

16. The optical switch of claim 15, comprising at least three output optical pathways.

17. The optical switch of claim 16, wherein the number of binary control elements is the rounded-up integer value of $Log_2 N$, where N is the number of the at least three output optical pathways.

18. The optical switch of claim 15, further including at least three input optical pathways.

19. The optical switch of claim 18, wherein the number of binary control elements is the rounded-up integer value of $Log_2 N$, where N is the number of the at least three input optical pathways.

20. An optical switch comprising a binary control element moveable between a first position and a second position, the binary control element including a first angle tuning element and a second angle tuning element, wherein the first angle tuning element is able to adjust the optical pathway of a first optical signal when the binary control element is in the first position, and the second angle tuning element is able to adjust the pathway of a second optical signal when the binary control element is in the second position.

* * * * *